(12) United States Patent
Urie

(10) Patent No.: US 9,001,722 B2
(45) Date of Patent: Apr. 7, 2015

(54) DEVICE FOR SELECTION OF BEARER CHANNEL TYPE FOR BROADCASTING CONTENTS TO COMMUNICATION TERMINALS

(75) Inventor: Allstair Urie, Paris (FR)

(73) Assignee: Alcatel Lucent, Boulogne-Billancourt (FR)

( * ) Notice: Subject to any disclaimer, the term of this patent is extended or adjusted under 35 U.S.C. 154(b) by 1399 days.

(21) Appl. No.: 12/446,331

(22) PCT Filed: Oct. 19, 2007

(86) PCT No.: PCT/EP2007/009093
§ 371 (c)(1),
(2), (4) Date: Oct. 11, 2010

(87) PCT Pub. No.: WO2008/046643
PCT Pub. Date: Apr. 24, 2008

(65) Prior Publication Data
US 2011/0013549 A1 Jan. 20, 2011

(30) Foreign Application Priority Data

Oct. 20, 2006 (FR) ...................................... 06 54397

(51) Int. Cl.
*H04W 4/00* (2009.01)
*H04W 72/00* (2009.01)
(Continued)

(52) U.S. Cl.
CPC ............. *H04L 29/06* (2013.01); *H04W 76/002* (2013.01); *H04W 72/005* (2013.01)

(58) Field of Classification Search
CPC ...... H04H 60/80; H04L 12/189; H04L 67/26; H04L 12/1836; H04L 29/06027; H04L 65/608; H04L 65/4076; H04L 29/06; H04L 67/325; H04L 1/0057; H04L 1/0083; H04L 1/0041; H04N 7/24; H04N 21/26283; H04N 21/84; H04N 21/85406; H04N 21/6131; H04W 72/005; H03M 13/2707; H03M 13/2915; H03M 13/373
USPC .................................................. 370/228–356
See application file for complete search history.

(56) References Cited

U.S. PATENT DOCUMENTS 5,936,949 A * 8/1999 Pasternak et al. ............. 370/328
6,940,916 B1 * 9/2005 Warner et al. ................. 375/261
(Continued)

FOREIGN PATENT DOCUMENTS

FR 2907627 A1 * 4/2008
GB 2 424 795 A 10/2006
(Continued)

OTHER PUBLICATIONS

Internatioal Search Report.

*Primary Examiner* — Venkatesh Haliyur
(74) *Attorney, Agent, or Firm* — Fay Sharpe LLP

(57) ABSTRACT

A device is dedicated to selection of a type of bearer channel for broadcasting contents between a service platform adapted to set up point-to-point and point-to-multipoint type bearer channels and a terminal, each content being associated with at least one set of broadcast parameters defining at least the type of bearer channel for broadcasting it and the frequency channel on which it is broadcast on a bearer channel of the type. This device comprises: i) control module adapted, in case of selection of a content by the user of a communication terminal, to determine data representing at least one set of broadcast parameters associated with the selected content, and ii) selection module adapted, in the presence of a set that has been determined designating an accessible point-to-multipoint bearer channel, to communicate to the terminal the broadcast parameters of that set so that it can receive the selected content on the designated point-to-multipoint type bearer channel, and if not, to request the creation by the service platform of a point-to-point type bearer channel with the terminal so that it can receive the selected content on the point-to-point type bearer channel that has been created.

15 Claims, 1 Drawing Sheet

Figure 1:
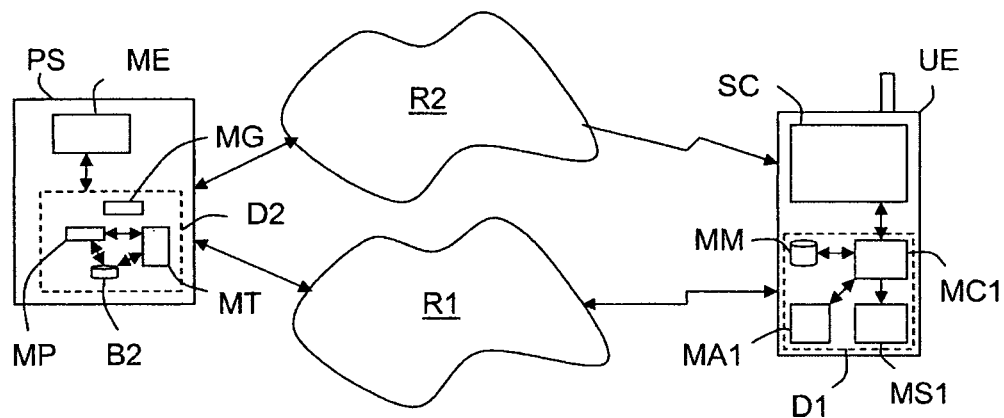

(51) Int. Cl.
*G06F 15/173* (2006.01)
*H04L 29/06* (2006.01)
*H04W 76/00* (2009.01)

(56) References Cited

U.S. PATENT DOCUMENTS

| | | | | |
|---|---|---|---|---|
| 6,965,580 | B1* | 11/2005 | Takagi et al. | 370/312 |
| 7,515,650 | B1* | 4/2009 | Warner et al. | 375/302 |
| 7,599,620 | B2* | 10/2009 | Graves et al. | 398/51 |
| 7,813,451 | B2* | 10/2010 | Binder et al. | 375/316 |
| 7,917,644 | B2* | 3/2011 | Vedantham et al. | 709/231 |
| 7,958,542 | B2* | 6/2011 | Herrmann | 726/4 |
| 7,970,002 | B2* | 6/2011 | Hu | 370/432 |
| 8,031,735 | B2* | 10/2011 | Kuo | 370/430 |
| 8,145,120 | B2* | 3/2012 | Vermola et al. | 455/3.01 |
| 8,209,593 | B2* | 6/2012 | Park et al. | 714/807 |
| 8,321,893 | B2* | 11/2012 | Xu et al. | 725/51 |
| 8,532,037 | B2* | 9/2013 | Xu et al. | 370/329 |
| 2002/0191250 | A1* | 12/2002 | Graves et al. | 359/128 |
| 2004/0213294 | A1* | 10/2004 | Hughes | 370/485 |
| 2005/0007971 | A1* | 1/2005 | Jeong et al. | 370/312 |
| 2005/0025108 | A1* | 2/2005 | Dillinger et al. | 370/342 |
| 2005/0090235 | A1* | 4/2005 | Vermola et al. | 455/414.3 |
| 2005/0147040 | A1* | 7/2005 | Vayanos et al. | 370/235 |
| 2005/0169205 | A1* | 8/2005 | Grilli et al. | 370/313 |
| 2005/0172016 | A1* | 8/2005 | Kossi et al. | 709/223 |
| 2005/0193309 | A1* | 9/2005 | Grilli et al. | 714/752 |
| 2005/0282555 | A1* | 12/2005 | Swetina | 455/454 |
| 2007/0173202 | A1* | 7/2007 | Binder et al. | 455/68 |
| 2007/0180133 | A1* | 8/2007 | Vedantham et al. | 709/230 |
| 2007/0184833 | A1* | 8/2007 | Xu et al. | 455/432.1 |
| 2008/0004054 | A1* | 1/2008 | Barbaresi et al. | 455/466 |
| 2008/0065548 | A1* | 3/2008 | Muijen | 705/51 |
| 2008/0109861 | A1* | 5/2008 | Xu et al. | 725/105 |
| 2008/0112352 | A1* | 5/2008 | Kuo | 370/312 |
| 2008/0112367 | A1* | 5/2008 | Kuo | 370/335 |
| 2008/0113662 | A1* | 5/2008 | Kuo | 455/418 |
| 2008/0184299 | A1* | 7/2008 | Park et al. | 725/39 |
| 2009/0228927 | A1* | 9/2009 | Xu et al. | 725/51 |
| 2009/0310566 | A1* | 12/2009 | Xu et al. | 370/331 |
| 2011/0013549 | A1* | 1/2011 | Urie | 370/312 |
| 2011/0075612 | A1* | 3/2011 | Guo et al. | 370/329 |
| 2011/0255460 | A1* | 10/2011 | Lohmar et al. | 370/312 |
| 2013/0279375 | A1* | 10/2013 | Newberg et al. | 370/260 |

FOREIGN PATENT DOCUMENTS

| | | | |
|---|---|---|---|
| WO | WO 2006/104946 A1 | 10/2006 | |
| WO | WO 2008046643 A1 * | 4/2008 | H04L 29/06 |

* cited by examiner

DEVICE FOR SELECTION OF BEARER CHANNEL TYPE FOR BROADCASTING CONTENTS TO COMMUNICATION TERMINALS

The invention concerns communication systems and more precisely broadcasting of contents by such systems to communication terminals.

Here "communication system" means a system consisting of a communication network, where applicable a mobile communication network, enabling interactive communication and able to deliver streams of point-to-point (or unicast) type, a network for broadcasting contents by cable or by radio (satellite and/or terrestrial and/or integrated into a mobile communication network, for example of UMTS/MBMS type), and a centralized or distributed service platform for setting up transport (or bearer) channels of point-to-point (or unicast) type and point-to-multipoint (or broadcast) type, via the communication network and the broadcast network, between it and communication terminals connected to the communication network and to the broadcast network.

Moreover, here "contents" means voluminous sets of data defining a television or video or audio (radiophonic or musical) or games or multimedia program, or an electronic data processing (or data) file, or even service information defining contents to be broadcast (for example of ESG (Electronic Service Guide) type).

Moreover, here "communication terminal" means any type of fixed or mobile (or portable or cellular) communication equipment capable at least of receiving contents transmitted by cable and/or by radio (where applicable by a satellite) and of transmitting data (for example in the form of messages) to its parent (communication) network. Such a terminal can therefore be of hybrid type in order to receive contents broadcast by terrestrial means and by satellite. It can for example be a fixed or mobile (or cellular) telephone, a personal digital assistant (PDA), fixed or portable equipment for receiving television programs by radio, for example a personal stereo or a portable television, fixed or portable equipment for receiving video or musical programs, a fixed or portable computer, or radio equipment on board a vehicle (car, truck, bus, train and the like).

As the person skilled in the art knows, a service platform can broadcast to terminals (for example mobile terminals) contents delivered by entities (for example television or radio stations) either by means of a point-to-point (or unicast—for example according to the UMTS/HSDPA standard) bearer channel, via their home (mobile) network, or by means of a point-to-multipoint (or broadcast—for example according to the DVB-H, UMTS/MBMS or T-DMB standard) type bearer channel, via the broadcast network.

More precisely, when the user of a terminal, for example a mobile terminal, wishes to access a content, they must first display on their screen a menu, for example of ESG (Electronic Service Guide) type, that offers a set of contents (or a set of entities delivering different contents, which amounts to the same thing in some cases) containing among others the content looked for. Remember that an ESG contains data defining definitions of contents and/or entities and sets of broadcast parameters associated with the contents or entities. The user must then select the content that interests them.

If the selected content is associated with a set of broadcast parameters designating a point-to-multipoint bearer channel, then the mobile terminal uses those broadcast parameters to receive the selected content on the designated point-to-multipoint bearer channel. Remember that in a standard of the DVB-H type the ESG contains SGP (Service Descriptor Protocol) information that enables the mobile terminal to receive a particular stream in a radio (or microwave) signal containing multiplexed IP data.

If the selected content is associated with a set of broadcast parameters designating a point-to-point type bearer channel, then the mobile terminal must request the service platform (for example by means of an HTTP type request) to create a point-to-point type bearer channel in order to be able to receive the selected content on the point-to-point type bearer channel created.

As the ESG data is not updated very frequently, it can happen that a terminal, for example a mobile terminal, is unable to access a selected content with the bearer channel that is designated by the set of broadcast parameters associated with that content.

Moreover, the coverage of broadcast networks and mobile networks generally vary within the same region or the same area, as well as from one region or area to another. Consequently, if a mobile terminal is moving around, reception of a broadcast content can be interrupted if it enters a shadow area of the network that is being used by the bearer channel for that content. In this case, the user of the mobile terminal may be obliged to display again on his screen the ESG menu that offers the content whose broadcasting has been interrupted in order to select it again, in the hope that the ESG data will have been updated and enable access to the content via a bearer channel of a different type to that used until then.

Moreover, each of the two types of transport (or bearer) channel suffers at least one major drawback that restricts its use. In fact, point-to-point type bearer channels have a content data transmission capacity that is limited and consume a large bandwidth if many of them are used simultaneously. As for a point-to-multipoint type bearer channel, it has a relatively small bandwidth which limits the number of different contents (for example the number of television channels) that it can broadcast in parallel on different frequencies.

The invention therefore has the object of improving on the situation.

To this end it proposes a device dedicated to selection of a type of bearer channel for broadcasting contents between a service platform and a (communication) terminal, where applicable a mobile terminal.

This selection device is characterized in that it comprises:
control means responsible, in case of selection of a content by the user of a communication terminal, for determining data representing at least one set of broadcast parameters associated with that selected content, and
selection means responsible, in the presence of a set that has been determined designating an accessible point-to-multipoint bearer channel, for communicating to the terminal the broadcast parameters of that set so that it can receive the selected content on the designated point-to-multipoint type bearer channel, and if not, for requesting the creation by the service platform of a point-to-point type bearer channel with the terminal so that it can receive the selected content on the point-to-point type bearer channel that has been created.

The device according to the invention can have other features and in particular, separately or in combination:
in a first embodiment, in the presence of sets designating point-to-point and point-to-multipoint type bearer channels, its control means can be responsible for determining each set of broadcast parameters associated with the selected content. In this case, its selection means are responsible for determining the type of bearer channel designated by each set that has been determined, then, if the type of one of the sets that has been determined is point-to-multipoint, for communicating to the terminal the broadcast parameters of the set designating the point-to-multipoint type so that it can receive the selected content on the point-to-multipoint type bearer channel, and if not, for requesting the creation by the service platform of a point-to-point type bearer channel with the terminal so that it can receive said selected content on the point-to-point type bearer channel that has been created;

its control means can be responsible for determining the level and/or the quality of reception of the point-to-multipoint type bearer channel in the terminal. In this case, its selection means are responsible, in case of determination of a point-to-multipoint type bearer channel, for comparing the level and/or the quality of reception of that bearer channel to a chosen threshold, then, either for communicating to the terminal the broadcast parameters of the set designating the point-to-multipoint type if the level and/or the quality of reception is/are above the threshold, or for requesting the creation by the service platform of a point-to-point type bearer channel with the terminal if that level and/or that quality of reception is/are below or equal to the threshold;

it can comprise analysis means responsible for determining if a content newly selected by the user of a terminal is different from the content previously being broadcast to that terminal, and, in case of difference, for generating a message to the service platform to signal the change of content to it;

in a second embodiment, in the presence of sets designating point-to-point and point-to-multipoint type bearer channels, its control means can be responsible, in case of selection of a content by the user of a terminal, for determining "rerouting" data designating an address at which each set of broadcast parameters associated with the selected content is stored, then for communicating the rerouting data that has been determined to the selection means. In this case, its selection means are responsible for determining each set of broadcast parameters stored at the address defined by the rerouting data, then for determining the type of bearer channel designated by each set that has been determined, then, if the type of one of the sets that has been determined is point-to-multipoint, for communicating to the terminal the broadcast parameters of the set designating the point-to-multipoint type so that it can receive the selected content on the point-to-multipoint type transport channel, and if not, for requesting the creation by the service platform of a point-to-point type bearer channel with the terminal so that it can receive the selected content on the point-to-point type bearer channel that has been created;

its control means can be responsible for determining the level and/or the quality of reception of the point-to-multipoint type bearer channel in the terminal and for communicating the rerouting data and the level and/or the quality of reception that have been determined to the selection means. In this case, its selection means are responsible, in case of determination of a point-to-multipoint type bearer channel, for comparing the level and/or the quality of reception of that bearer channel to a chosen threshold, then, either for communicating to the terminal the broadcast parameters of the set designating the point-to-multipoint type if that level and/or that quality of reception is/are above the threshold, or for requesting the creation by the service platform of a point-to-point type bearer channel with the terminal if that level and/or that quality of reception is/are below or equal to the threshold;

it can comprise analysis means responsible, in case of reception of rerouting data concerning a terminal, for determining if that rerouting data designates a content different from the content previously being broadcast to the terminal, and, in case of difference, for generating a message signaling a change of content;

it can comprise processing means responsible, in case of reception of a message signaling a change of content, for incrementing by one unit the number of terminals having access to the content newly requested and for decrementing by one unit the number of terminals having access to the content that is the subject of the change in the received message, so as to count in real time the number of terminals having access to the same content;

it can equally comprise calculation means responsible for determining from numbers counted by the processing means statistics representing access percentages to contents of a chosen group in a given time interval;

it can also comprise management means responsible for sending chosen terminals having access to a chosen content broadcast on point-to-point type bearer channels messages requesting them to receive that chosen content on a point-to-multipoint type bearer channel if the latter channel becomes accessible to those chosen terminals;

these management means can also be responsible for sending chosen terminals having access to a chosen content broadcast on a point-to-multipoint type bearer channel messages requesting them to receive that chosen content on new point-to-point type bearer channels, before that chosen content can no longer be broadcast to them by means of the point-to-multipoint type bearer channel.

The invention also proposes a first communication terminal adapted to receive contents broadcast on point-to-point and point-to-multipoint type bearer channels, and equipped with a selection device of the same type as the first embodiment described hereinabove and comprising storage means accessible to the control means and adapted to store the data (for example ESG data) defining the sets of broadcast parameters associated with the contents to be broadcast.

The invention also proposes a second communication terminal adapted to receive contents broadcast in point-to-point and point-to-multipoint type bearer channels, and equipped only with control means of a selection device of the same type as the second embodiment described hereinabove and storage means accessible to the control means and adapted to store the data (for example ESG data) defining the sets of broadcast parameters associated with the contents to be broadcast.

The invention also proposes a first service platform adapted to set up point-to-point and point-to-multipoint type bearer channels with the first communication terminals described hereinabove and comprising processing means, and possibly calculation means, of a selection device of the same type as the second embodiment described hereinabove.

The invention also proposes a second service platform adapted to set up point-to-point and point-to-multipoint type bearer channels with the second communication terminals described hereinabove and comprising control means of a selection device of the same type as the second embodiment described hereinabove. Such a second service platform can also comprise analysis means and possibly processing means and calculation means of a selection device of the same type as the second embodiment described hereinabove.

Figure 2:
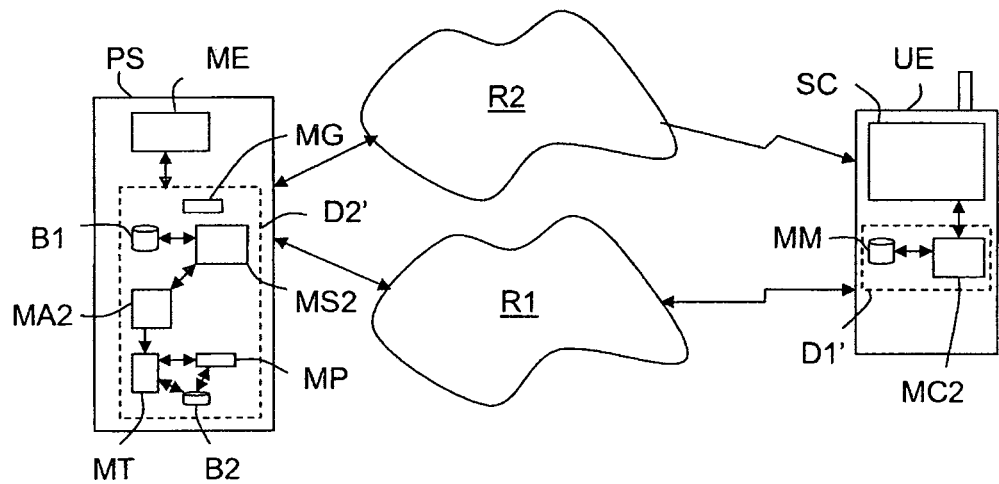

Other features and advantages of the invention will become apparent on reading the following detailed description and examining the appended drawings, in which:

FIG. 1 is a very diagrammatic and functional illustration of a mobile terminal equipped with a first portion of a first embodiment of a selection device according to the invention and coupled via a broadcast network and a mobile network to a service platform equipped with a second portion of this first embodiment of the selection device according to the invention, and FIG. 2 is a very diagrammatic and functional illustration of a mobile terminal equipped with a first portion of a second embodiment of a selection device according to the invention and coupled via a broadcast network and a mobile network to a service platform equipped with a second portion of this second embodiment of the selection device according to the invention.

The appended drawings can constitute part of the description of the invention as well as contributing to the definition of the invention, if necessary.

An object of the invention is to enable selection of the type of bearer channel that is the most suitable, at a given time, for broadcasting to a (communication) terminal, where applicable a mobile terminal, a content selected by its user.

The invention is described first with reference to FIG. 1.

As shown diagrammatically in FIG. 1, implementing the invention necessitates a communication system consisting of a communication network R1 enabling interactive communication and able to deliver point-to-point (or unicast) type streams, a network for broadcasting contents by cable (cable or optical fiber) or by radio (satellite and/or terrestrial and/or integrated into a mobile communication network, for example of UMTS/MBMS type) R2, and a distributed or centralized service platform PS responsible for setting up transport (or bearer) channels of point-to-point and point-to-multipoint (or broadcast) type via the communication network R1 and the broadcast network R2, between it and communication terminals UE connected to the communication network R1 and to the broadcast network R2.

It is considered hereinafter by way of illustrative and non-limiting example that the communication network R1 is of mobile type, for example a public land mobile radio network of UMTS (3G) or equivalent type, and that the broadcast network R2 is a terrestrial radio network of DVB-H type (or any of the evolutions thereof in preparation by the DVB-SSP group). However, the invention is not limited to these examples of transmission networks. It concerns in fact all terrestrial and/or satellite communication networks, whether fixed with broadband (DSL or cable) or mobile access, capable of broadcasting contents to terminals (where applicable mobile terminals) by means of point-to-point (or unicast) type bearer channels, and in particular those of WiMAX type, and all terrestrial and/or satellite broadcast networks and/or broadcast networks integrated into a mobile communication network, capable of broadcasting contents to terminals by means of point-to-multipoint (or broadcast) type bearer channels, where applicable via terrestrial repeaters.

Moreover, because of the example considered here, it is considered hereinafter, by way of illustrative and nonlimiting example, that the communication terminals UE are of mobile type, for example mobile (or cellular) telephones. They will be referred to as "mobile terminals" hereinafter. However, the invention is not limited to this type of mobile terminal. It concerns in fact any type of fixed or mobile (or portable) communication equipment capable at least of receiving contents transmitted by cable or by radio (where applicable by a satellite) and of transmitting data (for example in the form of messages) to its home (communication) network. Such a terminal can therefore be of hybrid type in order to receive contents broadcast by terrestrial means and by satellite. For example, it can be a fixed telephone, a personal digital assistant (PDA), fixed or portable equipment for receiving television programs by radio, for example a personal stereo or a fixed or portable television, fixed or portable equipment for receiving video or musical programs, a fixed or portable computer, or radio equipment on board a vehicle (car, truck, bus, train and the like).

Finally, it is considered hereinafter by way of illustrative and nonlimiting example that the contents broadcast are television programs delivered by television stations (or entities). However, the invention is not limited to this type of content. It concerns in fact any type of content, where applicable multimedia content, consisting of a voluminous set of data defining service information defining contents to be broadcast (for example of ESG type) or a television or video or audio (radiophonic or musical) or games program or multimedia program or an electronic data processing (or data) file.

The invention proposes a selection device D1, D2 (or D1', D2') responsible for selecting the type of bearer channel that is the most suitable, at a given time, for broadcasting to a communication terminal UE (here a mobile terminal) a content selected by its user.

That device D1, D2 (or D1', D2') comprises at least a control module MC1 (or MC2) and a selection module MS1 (or MS2).

Whatever embodiment is envisaged, the control module MC1 (or MC2) is part of a first portion D1 (or D1') of the device, which is installed in a (mobile) terminal UE. The control module MC1 (or MC2) is operative each time that the user of a mobile terminal UE selects a content via a menu displayed on the screen SC of said mobile terminal UE.

It will be noted that this control module MC1 (or MC2) can be responsible for controlling the display of content selection menus. These menus are for example constituted from ESG (Electronic Service Guide) type information that defines definitions of contents and/or entities and sets of broadcast parameters associated with the contents or entities, and in particular the types of bearer channel enabling the contents to be broadcast and the frequencies on which the contents are broadcast on said bearer channels. In other words, to each content that can be selected there corresponds at least one set of broadcast parameters. This information data is generally broadcast via the communication network R1 and/or the broadcast network R2 or via another network, by the service platform PS to the mobile terminals UE which store it in a memory MM that where applicable is part of the device D1, D2 (or D1', D2'), as shown in the figures.

The control module MC1 (or MC2) is primarily responsible for determining, for example in the memory MM, data that represents at least one set of broadcast parameters associated with the selected content.

The selection module MS1 (or MS2) can be installed either in the first portion D1 of the device, i.e. in a mobile terminal UE, as shown in FIG. 1, or in a second portion D2' of the device (complementary to the first portion) installed in the service platform PS, as shown in FIG. 2.

The selection module MS1 (or MS2) is operative each time that a control module MC1 (or MC2) has determined data representing one or more sets of broadcast parameters associated with a selected content. It is responsible, in the presence of a set that has been determined and designates an accessible point-to-multipoint type bearer channel, for communicating to the mobile terminal UE concerned the broadcast parameters of that set in order for it to be able to receive the selected content on the designated point-to-multipoint type bearer channel and, if this is not the case, for requesting the service platform PS to create a point-to-point type bearer channel with the (mobile) terminal UE concerned in order for it to be able to receive the selected content on the point-to-point type transport channel that has been created.

Several particular embodiments of the selection device D1, D2 (or D1', D2') are described in more detail next.

In a first embodiment (shown in FIG. 1), the control module MC1 is responsible for determining, for example in the memory MM which stores the (ESG type) content information data of the mobile terminal UE in which it is installed, each set of broadcast parameters associated with a selected content. This is a result of the content information data that is available. In the present case, each content that can be selected is associated with one or more sets of broadcast parameters so that the control module MC1 can determine in the memory MM all the sets that are associated with a selected content. In other words, a given content can here be broadcast by the communication network R1 and/or by the broadcast network R2.

The control module MC1 communicates each set of broadcast parameters (that it has determined) to the selection module MS1 in order for it to determine the type of bearer channel that is designated by each of those sets.

If the selected content is accessible via a point-to-multipoint (broadcast) type bearer channel, then the selection module MS1 communicates to its mobile terminal UE the broadcast parameters from the set that designates the point-to-multipoint type in order for it to extract therefrom in the standard way the information that will enable it to find the frequency channel on which the selected content is broadcast in the point-to-multipoint bearer channel. Remember that for a DVB-H type standard the set of broadcast parameters comprises SDP type information that enables the mobile terminal UE to receive a particular stream within a radio (or microwave) signal containing multiplexed IP data. The mobile terminal UE is then in a position to receive the selected content on the designated point-to-multipoint type bearer channel.

If the selected content is accessible only via a point-to-point type bearer channel, the selection module MS1 must request the creation of a point-to-point type bearer channel. To do this, it uses the standard procedure that consists in generating a request to the service platform PS to set up a point-to-point bearer channel between said service platform PS and its mobile terminal UE, to broadcast the selected content. That request is transmitted by the mobile terminal UE via the mobile network R1. This request is of HTTP type, for example. On reception of this request, the service platform PS creates the requested point-to-point bearer channel and then transmits the selected content on that channel in stream form. The mobile terminal UE is then in a position to receive the selected content on the point-to-point type bearer channel that has been created. It will be noted that the aforementioned creation is handled by a bearer channel set-up module ME that is part of the service platform PS and well known to the person skilled in the art, and for this reason is not described here.

It will further be noted that in a variant the control module MC1 can also be responsible, each time that a content is selected, for determining the level and/or the quality of reception of the point-to-multipoint type bearer channel at the level of its mobile terminal UE. This information can be useful to the selection module MS1 if the set of broadcast parameters (determined by the control module MC1) designates a point-to-multipoint type transport channel. In fact, it can happen that the level and/or the quality of reception of that transport channel is or are not sufficient to enable the mobile terminal UE to receive the selected content properly. In this case, it is preferable (or necessary) to request the setting up of a point-to-point bearer channel when that is possible.

The selection module MS1 is therefore responsible, when it has determined a point-to-multipoint type bearer channel, for comparing to a chosen threshold the level and/or the quality of reception of the bearer channel (communicated by the control module MC1). Then, if the level and/or the quality of reception is or are above the threshold, the selection module MS1 communicates to its mobile terminal UE the broadcast parameters from the set that designates the point-to-multipoint type bearer channel, as indicated hereinabove. If the selection module MS1 has determined that the selected content can be broadcast via a point-to-multipoint bearer channel and via a point-to-point bearer channel but that, at the same time, the level and/or the quality of reception of the point-to-multipoint transport channel is or are below or equal to the threshold, the selection module MS1 requests the service platform PS to create a point-to-point type bearer channel with its mobile terminal UE, as indicated hereinabove.

It will be noted that in the first embodiment the selection device can include in its first portion D1 an analysis module MA1 responsible for determining if the content that has just been selected by the user of its (mobile) terminal UE differs from the content that the latter was receiving until then. If there is any difference, this indicates that the user has decided to change content (for example to change television channel), and the analysis module MA1 generates a specific message to the service platform PS to inform it of this change of content. This specific message is sent by the mobile terminal UE via the mobile network R1.

Clearly in the first embodiment the selection device can comprise only a first portion D1 installed in a mobile terminal UE. However, as seen later, the selection device can equally include a complementary, although accessory, second portion D2, installed in the service platform PS.

A second embodiment of the selection device D1', D2' according to the invention is described next with reference to FIG. 2.

In this second embodiment the selection device necessarily comprises a first portion D1' installed in a (mobile) terminal UE and a second portion D2' installed in the service platform PS.

The first portion D1' comprises only the control module MC2. The latter is responsible, each time that the user of its mobile terminal UE has selected a content, for determining, for example in the memory MM of its mobile terminal UE, data known as "rerouting" data that designates the address at which each set of broadcast parameters that is associated with the selected content is stored. This results from the content information data that is available. In the present case, each content that can be selected is associated with rerouting data (stored in the memory MM).

The control module MC2 therefore determines in the memory MM all the rerouting data that is associated with the selected content, and then communicates it to the selection module MS2, which is part of the second portion D2' of the selection device, which is installed in the service platform PS. To this end it generates a specific message that it has its mobile terminal UE transmit via the mobile network R1.

When the service platform PS receives the specific message, it forwards it to its selection module MS2 in order for it to determine each set of broadcast parameters stored at each address that is defined by a received rerouting data. For example, the second portion D2' of the selection device comprises a memory B1, accessible to the selection mobile MS2, and in which the content information data (for example of ESG type) is stored in corresponding relationship to the rerouting data. In the present instance, each content that can be selected is associated with at least one set of broadcast parameters itself associated with rerouting data.

Once the selection module MS2 has selected each set of broadcast parameters associated with the selected content it determines the type of bearer channel that is designated by each of those sets.

If the selected content is accessible only via a point-to-multipoint (broadcast) type channel, then the selection module MS2 generates a specific message to the mobile terminal UE concerned in order to send it the broadcast parameters of the set that designates the point-to-multipoint type in order for it to be able in the conventional way to extract from it the information that will enable it to determine the frequency channel on which the selected content is broadcast on the point-to-multipoint bearer channel. The mobile terminal UE is then in a position to receive the selected content on the designated point-to-multipoint type bearer channel.

If the selected content is accessible only via a point-to-point type bearer channel, the selection module MS2 requests the set-up module ME of the service platform PS, in which it is installed, to create a point-to-point type bearer channel between it and the mobile terminal UE concerned, in order to broadcast the selected content. On reception of this request, the service platform PS creates the requested point-to-point bearer channel and then transmits the selected content on the latter, in stream form. The (mobile) terminal UE is then in a position to receive the selected content on the point-to-point type bearer channel that has been created.

The variant described hereinabove for the first embodiment can also be applied to the second embodiment. More precisely, the control module MC2 can also be responsible, each time that a content is selected, for determining the level and/or the quality of reception of the point-to-multipoint type bearer channel at the level of its (mobile) terminal UE. It then has its mobile terminal UE transmit the value of this level and/or this quality via the mobile network R1 in the specific message that contains the rerouting data.

The selection module MS2 is then responsible, when it has determined a point-to-multipoint type bearer channel, for comparing to a chosen threshold the level and/or the quality of reception of the bearer channel (communicated by the control module MC2). Then, if the level and/or the quality of reception is or are above the threshold, the selection module MS2 generates a specific message to the mobile terminal UE concerned in order to send it the broadcast parameters from the set that designates the point-to-multipoint type, as indicated hereinabove. If the selection module MS2 has determined that the selected content could be broadcast by a point-to-multipoint bearer channel and by a point-to-point bearer channel, but that at the same time the level and/or the quality of reception of the point-to-multipoint bearer channel is or are below or equal to the threshold, the selection module MS2 requests its service platform PS to create a point-to-point type bearer channel with the mobile terminal UE concerned, as indicated hereinabove.

It will be noted that in the second embodiment, as in the first embodiment, the selection device can include an analysis module MA1 responsible for determining if the content that has been selected by the user of a (mobile) terminal UE differs from the content that was being broadcast to the latter until then. This analysis module MA2 is now installed in the second portion D2' of the selection device, and coupled to its selection module MS2, for example. For example, the second portion D2' of the selection device comprises a memory (or database) B2 accessible to the analysis module MA2 and in which is stored each identifier of the content (or the identifier of each entity that delivers a content) that is being broadcast to at least some of the (mobile) terminals UE.

Thus, if the analysis module MA2 is advised of the arrival of a specific message designating (indirectly) a content and coming from a mobile terminal UE, it accesses the memory B2 in order to determine if there is a change of content required for that mobile terminal UE. In the case of a change of content, the analysis module MA2 generates a specific message which indicates it.

Whichever embodiment is envisaged, the second portion D2 (or D2') of the selection device can include a processing module MT responsible, when it receives a message indicating a change of content (generated by an analysis module MA1 (or MA2)), for incrementing by one unit the number of (mobile) terminals UE having access to a newly requested content, and for decrementing by one unit the number of (mobile) terminals UE having access to the content that was the subject of a change in the message received. The number of (mobile) terminals UE having access to each content can be stored in the memory B2 of the selection device, for example. However, another memory, possibly external to the selection device, could be used for this purpose. Thanks to this function the processing module MT can count in real time the number of (mobile) terminals UE that have access at a given time to the same content.

Moreover, as still whichever embodiment is envisaged, the second portion D2 (or D2') of the selection device can equally include a calculation module MP responsible for determining, from numbers that are counted by the processing module MT (and that are stored in the memory B2, for example), statistics representing access percentages to each of the contents forming part of a chosen group of contents, in a given time interval or at a given time. This can provide audience ratings in real time for programs broadcast by television channels (for example).

Moreover, and still whichever embodiment is envisaged, the second portion D2 (or D2') of the selection device can equally include a management module MG responsible for sending chosen (mobile) terminals UE that have access at a given time to a chosen content that is broadcast on point-to-point type bearer channels specific messages requesting them to receive that chosen content on a point-to-multipoint type bearer channel that is now accessible to them. This new access possibility can result from movement of a terminal UE into an area in which the point-to-multipoint type bearer channel is broadcast, for example, or because the latter has just been created for the content concerned, or is active again after a period of interruption. It is in fact preferable to broadcast a content in broadcast mode rather than in unicast mode as soon as possible.

To this end, the management module MG must be advised of any new possibility of access to a content by means of a point-to-multipoint type bearer channel. This can be done by transmitting a message to the management module MG or by the latter analyzing, for example periodically, data representing measurements that are transmitted by the terminals UE when they receive a point-to-point stream, or variations that have occurred in the content information data (for example of ESG type).

The specific messages are transmitted by the service platform PS to the (mobile) terminals UE concerned via the mobile network R1. This warns the (mobile) terminals UE as soon as selected content can be broadcast to them via a point-to-multipoint type bearer channel. Moreover, this limits the bandwidth occupied within the mobile network R1 by the point-to-point type bearer channels.

This kind of management module MG can also be responsible for sending chosen (mobile) terminals UE that have access to a chosen content broadcast on a point-to-multipoint type bearer channel specific messages requesting them to receive that chosen content on new point-to-point type bearer channels, before that chosen content can no longer be broadcast to them by means of the point-to-multipoint type bearer channel (for example because they are preparing to enter an area in which the latter channel is no longer accessible). These specific messages are transmitted by the service platform PS to the (mobile) terminals UE concerned via the mobile network R1. This warns the (mobile) terminals UE of a change of bearer channel type before they can no longer receive a content broadcast on the point-to-multipoint type bearer channel.

The selection device D1, D2 (or D1', D2') according to the invention, and in particular its control module MC1 (or MC2), its selection module MS1 (or MS2), and its analysis module MA1 (or MA2), if any, processing module MT, if any, calculation module MP, if any, and management module MG, if any, can be produced in the form of electronic circuits, software (or electronic data processing) modules, or a combination of circuits and software.

It will be noted that the service platform PS is not necessarily localized in the same equipment. These modules (MS2, MA2 and MG) can in fact be centralized or distributed between different locations and/or equipments (in this case they dialog with each other by means of a chosen protocol).

The invention is not limited to the selection device, mobile communication terminal and service platform embodiments described hereinabove by way of example only, but encompasses all variants that the person skilled in the art may envisage within the scope of the following claims.

The invention claimed is:

1. A device for selection of a type of bearer channel for broadcasting contents between a service platform, configured to set up point-to-point and point-to-multipoint type bearer channels, and a communication terminal, at least one content being associated with at least one set of broadcast parameters defining at least the type of the bearer channel for broadcasting the content and the frequency channel on which the content is broadcast on a bearer channel of the type, the device comprising:
   a control module configured, in case of selection of a content by the user of a communication terminal, to determine data representing at least one set of broadcast parameters associated with the selected content, and
   a selection module configured, in the presence of a set that has been determined designating an accessible point-to-multipoint bearer channel, to communicate to the terminal the broadcast parameters of the set so that the selected content is received on the designated point-to-multipoint type bearer channel, and if not, to request the creation by the service platform of a point-to-point type bearer channel with the terminal so that the selected content is received on the point-to-point type bearer channel that has been created,
      wherein, in the presence of sets designating point-to-point and point-to-multipoint type bearer channels:
      the control module is configured to determine at least one set of broadcast parameters associated with the selected content; and
      the selection module is configured to determine the type of bearer channel designated by each set that has been determined,
      wherein if the type of one of the sets that have been determined is point-to-multipoint, the selection module communicates to the terminal the broadcast parameters of the set designating the point-to-multipoint type so that the selected content is received on the point-to-multipoint type bearer channel, and
      wherein if the type is not one of the sets that have been determined is point-to-multipoint, to request the creation by the service platform of a point-to-point type bearer channel with the terminal so that the selected content is received on the point-to-point type bearer channel that has been created.

2. The device according to claim 1, wherein,
   the control module is configured to determine the level and the quality of reception of the point-to-multipoint type bearer channel at the level of the terminal; and
   the selection module is configured, in case of determination of a point-to-multipoint type bearer channel, to compare the level and the quality of reception of the bearer channel to a chosen threshold,
      wherein, if said level and the quality of reception are above the threshold, the selection module communicates to the terminal the broadcast parameters of the set designating the point-to-multipoint type, or
      wherein, if said level and the quality of reception are below or equal to said threshold, the selection module request the creation by the service platform of a point-to-point type bearer channel with the terminal.

3. The device according to claim 1, further comprising:
   an analysis module configured to determine if a content newly selected by the user of a terminal is different from the content previously being broadcast to the terminal, and, in case of difference, to generate a message reporting the change of content to the service platform.

4. The device according to claim 1, wherein:
   the control module is configured, in case of selection of a content by the user of a terminal, to determine rerouting data designating an address at which each set of broadcast parameters associated with the selected content is stored, then to communicate the rerouting data that has been determined to the selection module, and
   the selection module, in the presence of sets designating point-to-point and point-to-multipoint type bearer channels, is configured to determine each set of broadcast parameters stored at the address defined by the rerouting data, then to determine the type of bearer channel designated by each set that has been determined,
      wherein, if the type of one of the sets that have been determined is point-to-multipoint, the selection module communicates to the terminal the broadcast parameters of the set designating the point-to-multipoint type so that the selected content is received on the point-to-multipoint type transport channel, and
      if no set is determined to be point-to-multipoint, the selection module requests the creation by the service platform of a point-to-point type bearer channel with the terminal so that the selected content is received on the point-to-point type bearer channel that has been created.

5. The device according to claim 4, wherein:
   the control module is configured to determine the level and the quality of reception of the point-to-multipoint type bearer channel at the level of the terminal and to communicate the rerouting data and the level and the quality of reception that have been determined to the selection module, and the selection module is configured, in case of determination of a point-to-multipoint type bearer channel, to compare the level and the quality of reception of the bearer channel to a chosen threshold,
  wherein, if the level and the quality of reception are above the threshold to the selection module communicate to the terminal the broadcast parameters of the set designating the point-to-multipoint type, or
  wherein, if the level and the quality of reception are below or equal to the threshold, the selection module request the creation by the service platform of a point-to-point type bearer channel with the terminal.

6. The device according to claim 4, further comprising:
an analysis module configured, in case of reception of rerouting data concerning a terminal, to determine if that rerouting data designates a content different from the content previously being broadcast to the terminal, and, in case of difference, to generate a message signaling a change of content.

7. The device according to claim 3, further comprising:
a processing module configured, in case of reception of a message signaling a change of content, to increment by one unit the number of terminals having access to the content newly requested and to decrement by one unit the number of terminals having access to the content that is the subject of the change in the received message, so as to count in real time the number of terminals having access to the same content.

8. The device according to claim 1, further comprising:
a management module configured to send chosen terminals having access to a chosen content broadcast on point-to-point type bearer channels messages requesting them to receive the chosen content on a point-to-multipoint type bearer channel if the latter channel becomes accessible to the chosen terminals.

9. The device according to claim 8, wherein the management module is configured to send chosen terminals having access to a chosen content broadcast on a point-to-multipoint type bearer channel messages requesting them to receive the chosen content on new point-to-point type bearer channels, before the chosen content can no longer be broadcast to them via the point-to-multipoint type bearer channel.

10. The device according to claim 1 incorporated in a communication terminal configured to receive contents broadcast on point-to-point and point-to-multipoint type bearer channels, the terminal further comprising a storage module accessible to the control module and configured to store the data defining the sets of broadcast parameters associated with the contents to be broadcast.

11. The device according to claim 1 incorporated in a communication terminal configured to receive contents broadcast on point-to-point and point-to-multipoint type bearer channels, the terminal further comprising a storage module accessible to the control module and configured to store the data defining the sets of broadcast parameters associated with the contents to be broadcast.

12. The device according to claim 1 incorporated in a service platform configured to set up point-to-point and point-to-multipoint type bearer channels with the communication terminals the platform further comprising a processing module, and a calculation module, of the selection device.

13. The device according to claim 1 incorporated in a service platform configured to set up point-to-point and point-to-multipoint type bearer channels with the communication terminals, the platform further comprising a control module of the selection device.

14. The device according to claim 12 wherein, the platform further comprises an analysis module and a processing module and a calculation module of the selection device.

15. The device according to claim 12 wherein, the platform further comprises a management module of the selection device.

* * * * *